(12) United States Patent
Jiang et al.

(10) Patent No.: US 11,256,530 B2
(45) Date of Patent: Feb. 22, 2022

(54) TARGETED PAGE MIGRATION FOR GUEST VIRTUAL MACHINE

(71) Applicant: ATI TECHNOLOGIES ULC, Markham (CA)

(72) Inventors: Yinan Jiang, Markham (CA); Jeffrey G. Cheng, Markham (CA)

(73) Assignee: ATI TECHNOLOGIES ULC, Markham (CA)

(*) Notice: Subject to any disclaimer, the term of this patent is extended or adjusted under 35 U.S.C. 154(b) by 63 days.

(21) Appl. No.: 16/220,779

(22) Filed: Dec. 14, 2018

(65) Prior Publication Data
US 2020/0192691 A1 Jun. 18, 2020

(51) Int. Cl.
G06F 9/455 (2018.01)
G06F 12/1009 (2016.01)
G06T 1/20 (2006.01)

(52) U.S. Cl.
CPC ...... *G06F 9/45558* (2013.01); *G06F 12/1009* (2013.01); *G06F 2009/4557* (2013.01); *G06F 2009/45583* (2013.01); *G06T 1/20* (2013.01)

(58) Field of Classification Search
CPC ............. G06F 9/45558; G06F 12/1009; G06F 2009/45583; G06F 2009/4557
See application file for complete search history.

(56) References Cited

U.S. PATENT DOCUMENTS

| | | | |
|---|---|---|---|
| 9,733,980 B1* | 8/2017 | Khan | G06F 13/00 |
| 2016/0132443 A1* | 5/2016 | Davda | G06F 13/24 710/308 |
| 2016/0314008 A1* | 10/2016 | Han | G06F 9/4411 |
| 2017/0046185 A1* | 2/2017 | Tsirkin | G06F 9/45558 |
| 2017/0083240 A1* | 3/2017 | Rogers | G06F 13/28 |
| 2017/0329632 A1* | 11/2017 | Ma | G06F 9/4881 |

OTHER PUBLICATIONS

Ma et al. "gMig: Efficient GPU Live Migration Optimized by Software Dirty Page for Full Virtualization." VEE '18: Proceedings of the 14th ACM SIGPLAN/SIGOPS International Conference on Virtual Execution Environments, Mar. 2018 (Year: 2018).*
Zheng, Xiao, et al., "Live Migration Support for GPU with SR-IOV" KVM Forum, Oct. 24-26, 2018, Edinburgh, Scotland, UK, 19 pages.

* cited by examiner

*Primary Examiner* — Benjamin C Wu (57) ABSTRACT

A processing system identifies a subset of pages of memory allocated to a source guest virtual machine (VM) running at a first graphics processing unit (GPU) that were modified by the source guest VM and transferring only the subset to a destination guest VM running at a second GPU when performing a live migration from the source guest VM to the destination guest VM. The first GPU maintains a page table of system memory addresses or frame buffer addresses allocated to and accessed by the source guest VM during a session, including an indication of whether the data was modified. Based on the page table information, the processing system identifies and transfers only the modified pages from the source guest VM to the destination guest VM, thereby reducing the time and bandwidth used for migration.

20 Claims, 4 Drawing Sheets

TARGETED PAGE MIGRATION FOR GUEST VIRTUAL MACHINE

BACKGROUND

Conventional processing units such as graphics processing units (GPUs) support virtualization that allows multiple virtual machines (VMs) to use the hardware resources of the GPU to emulate separate and independent processors. For example, a processing unit, a memory, and other hardware in a processor together can be used to implement multiple VMs, with each VM functioning as a complete system platform that can execute a complete operating system when it is loaded into the processing unit. A hypervisor creates and runs the virtual machines, which are also referred to as guest machines or guests, by partitioning the hardware among the VMs (e.g., by allocating portions of the memory to the different VMs, loading a VM to run on a processing unit, or migrating a VM from one portion of the hardware to another portion of the hardware or from one hardware entity to another hardware entity). The hypervisor isolates the different VMs to protect the security and integrity of the VMs. For example, the hypervisor isolates different VMs from each other by allocating separate memory "pages" (contiguous cache lines) of system memory to each VM.

At times in the course of managing the hardware resources of the GPU, the hypervisor migrates VMs from one portion of the GPU hardware to another portion or from one hardware entity to another hardware entity. During a live migration, the hypervisor moves a running VM between different physical hardware without disconnecting the client or application. Memory, storage, and network connectivity of the VM are transferred from the original (source) guest machine to a destination machine. However, the more pages of memory that are transferred during a migration to the destination machine, the more bandwidth and time are required for the transfer, which can affect the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

To perform a live migration of a first virtual machine (also referred to as a source guest VM) to a second virtual machine (also referred to as a destination guest VM), a hypervisor copies pages of system memory allocated to the source guest VM as well as the contents of a frame buffer on the GPU of the source guest VM to the destination guest VM system memory and GPU frame buffer correspondingly. However, the hypervisor is typically not privy to which pages of system memory and frame buffer in the source guest VM were modified by the GPU. Therefore, when performing a live migration, the hypervisor typically copies to the destination guest VM all of the pages of system memory and frame buffer that were allocated to the source guest VM, including pages that were not modified by the GPU in the source guest VM. Copying unnecessary pages consumes additional bandwidth and slows the migration process, in some cases affecting the user experience.

FIGS. 1-4 illustrate a processing system configured to employ techniques for identifying a subset of pages of memory allocated to a source guest VM running at a first GPU that were modified by the source guest VM and transferring only the subset to a destination guest VM running at a second GPU when performing a live migration from the source guest VM to the destination guest VM. The GPU allocates pages of "local" memory from the frame buffer of the GPU and allocates pages of system memory of the source guest VM. The first GPU, on which the source guest VM is running, maintains a page table of frame buffer and system memory addresses allocated to and accessed by the GPU in the source guest VM during a session. The page table includes an entry for each memory address and an indication of whether the access of data at the memory address by the GPU in the source guest VM was pursuant to a read request, a write request, or a read/write request. The GPU updates the page table as the source guest VM makes additional requests to frame buffer and/or system memory.

During a live migration from the source guest VM at the first GPU to the destination guest VM at the second GPU, the hypervisor signals the source guest VM that a migration has started. The device driver running in the host OS reduces a time slice allocated to the source guest VM at the first GPU to slow the rate at which the source guest VM modifies memory pages. The hypervisor calls an application program interface (API) to the device driver running in the host to begin copying the frame buffer and system memory allocated to the source guest VM.

The API generates a list of pages modified by the first GPU running in the source guest VM (referred to as "dirty" pages) based on the page table maintained by the first GPU and provides the list of pages to the hypervisor. The hypervisor copies the dirty pages and transfers the dirty pages to the destination guest VM. After transferring the dirty pages to the destination guest VM, the hypervisor stops the source guest VM and identifies any additional frame buffer pages and system memory that were modified by the first GPU at the source guest VM during the time between first time copying the dirty pages and stopping the source guest VM. The hypervisor copies the additional dirty frame buffer and system memory pages and transfers the additional frame buffer and system memory dirty pages to the destination guest VM. The hypervisor also obtains the state of the first GPU in the source guest VM and transfers the state to the destination guest VM. The hypervisor restores the state to the second GPU at the destination guest VM and the destination guest VM begins running. By identifying and transferring only the dirty frame buffer and system memory pages from the source guest VM to the destination guest VM, the processing system reduces the amount of data that is transferred, thereby reducing the time and bandwidth used for migration. The shortened time for migration leads to an improved user experience.

Figure 1:
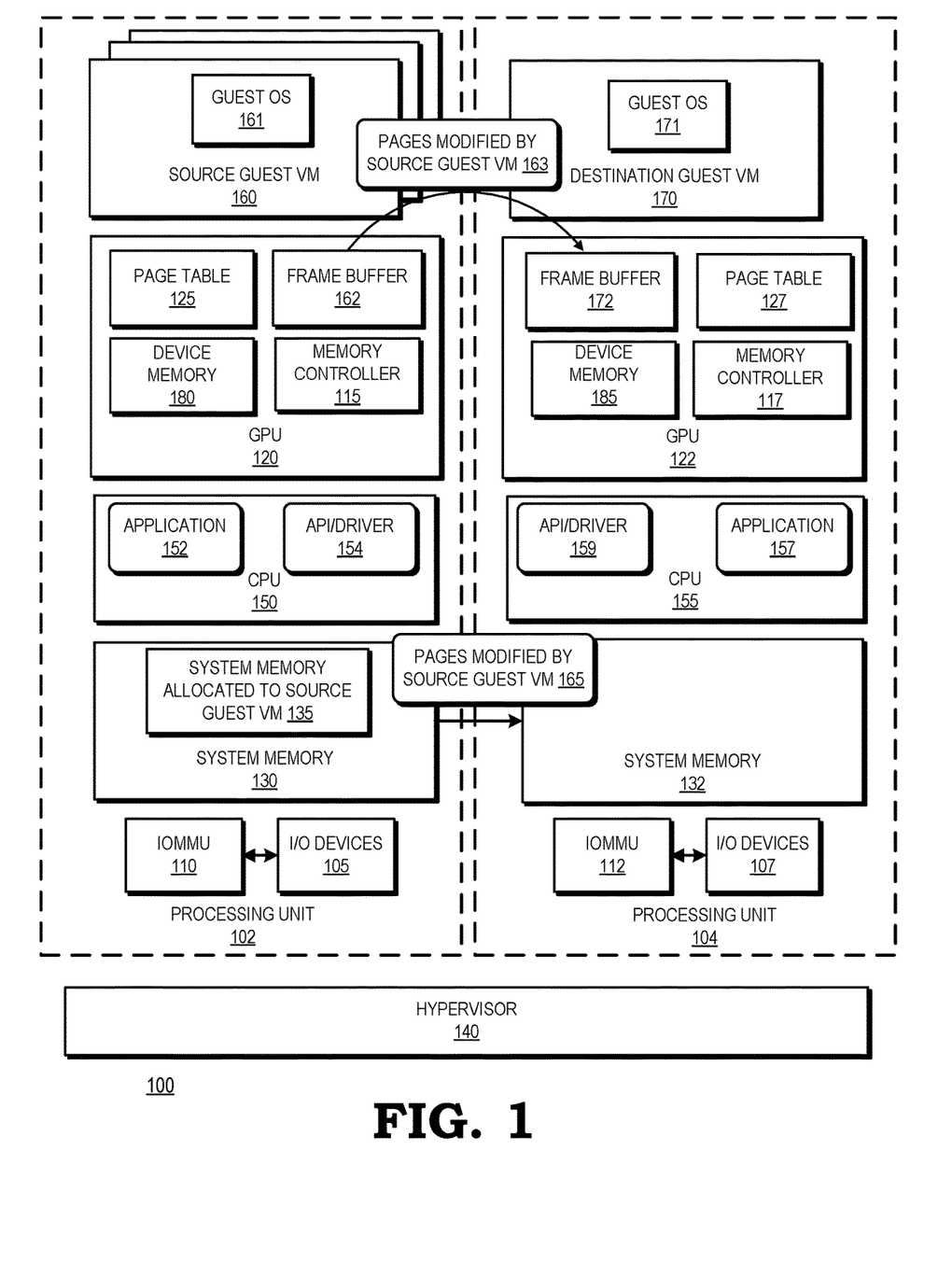
FIG. 1 is a block diagram of a processing system that identifies a subset of pages of memory allocated to a first virtual machine that were modified by the first virtual machine and transfers only the subset to a second virtual machine when performing a live migration in accordance with some embodiments.

FIG. 1 illustrates a processing system 100 that identifies a subset 165 of pages of system memory allocated to a source guest virtual machine (VM) 160 that were modified by the source guest VM 160 and transfers only the subset to a destination guest VM 170 when performing a live migration from a first graphics processing unit (GPU) 120 to a second GPU 122 in accordance with some embodiments. The processing system 100 includes a plurality of processing units 102, 104, each of which includes graphics processing units (GPUs) 120, 122 and central processing units (CPUs) 150, 155, a system memory 130, 132, device memory 180, 185 (also referred to as device internal memory), an input/output memory management unit (IOMMU) 110, 112, and input/output (I/O) devices 105, 107. The process system 100 also includes a hypervisor 140 which includes a host operating system (not shown). In some embodiments, the processing unit 102 and processing unit 104 run on separate processing systems. In such embodiments, separate hypervisors may be implemented for each of the processing systems. Some embodiments of the processing system 100 include buses, bridges, switches, routers, and the like, which are not shown in FIG. 1 in the interest of clarity.

Each of the GPUs 120, 122 includes a plurality of compute units that are generally configured to execute sets of instructions (e.g., computer programs) that manipulate the circuitry of the GPU 120, 122 to carry out defined tasks to render images for presentation on a display (not shown). For example, the GPUs 120, 122 render objects to produce values of pixels that are provided to the display, which uses the pixel values to display an image that represents the rendered objects. Each of the GPUs 120, 122 includes a core (not shown) that is made up of a set of compute units, a set of fixed function units, or a combination thereof for executing instructions concurrently or in parallel. Each of the GPUs 120, 122 includes tens, hundreds, or thousands of compute units or fixed function units for executing instructions.

Each of the GPUs 120, 122 includes a memory controller 115, 117, frame buffer 162, 172 (also referred to as device frame buffer), device memory 180, 185 (also referred to as device internal memory), and page table 125, 127. Each GPU 120, 122 can be configured to support multiple guest VMs, such as multiple source guest VM 160 and/or multiple destination guest VM 170. The system memories 130, 132 facilitate the execution of tasks performed by the GPUs 120, 122 by storing data used by the GPUs 120, 122. The system memories 130, 132 can be random access memory (RAM), non-volatile memory such as flash memory or a hard disk drive (HDD), and the like, or a combination thereof. The GPUs 120, 122 are generally configured to execute graphical operations on behalf of the guest VMs (e.g., source guest VM 160 and destination guest VM 170) to generate frames for storage at frame buffers 162 and 172, respectively. In some embodiments, the GPUs 120, 122 render the frames stored at the frame buffers 162, 172 and the rendered frames are displayed at a display device (not shown) of an electronic device. In some embodiments, one or both of the GPUs 120, 122 are general purpose computing devices with input/output capabilities.

Each of the memory controllers 115, 117 provide an interface for the GPUs 120, 122 to communicate with the system memories 130, 132. In some embodiments, the memory controllers 115, 117 perform other functions, such as interfacing with the IOMMUs 110, 112, and providing an interface between different processing units (not shown). The memory controllers 115, 117 receive memory access requests from the GPUs 120, 122, respectively, and control provision of those requests to the system memories 130, 132. In addition, the memory controllers 115, 117 receive responses to memory access requests from the system memories 130, 132 and control provision of the responses to the GPUs 120, 122. In some embodiments, the memory controllers 115, 117 receive memory access requests (e.g., direct memory access requests) from I/O devices 105, 107 of the processing system 100 and controls their provision to the system memories 130, 132.

As a general operational overview, the CPUs 150, 155 execute software applications 152, 157 that are represented as one or more sets of executable instructions stored, for example, in the system memories 130, 132 until accessed for execution. In some embodiments, the applications 152, 157, and API/drivers 154, 159 reside in the source guest VM 160 and destination guest VM 170, respectively. Therefore, initialization of the execution of the applications 152, 157 are triggered by the source guest VM 160 and destination guest VM 170, respectively. During the course of execution, the CPUs 150, 155 delegate a workload (e.g., the rendering of a display image) to the GPUs 120, 122 by sending one or more command packets representing the workload to command ring buffers (not shown) implemented in each of the system memories 130, 132 via GPUs driver and their associated application programming interfaces (APIs) (collectively referred to as API/drivers 154, 159) executed at the CPUs 150, 155 (and likewise represented as one or more sets of executable instructions stored in the system memories 130, 132 or elsewhere). The GPUs 120, 122 access the one or more command packets from the command ring buffers via the memory controllers 115, 117, respectively, and process the one or more command packets. In some embodiments, the source guest VM 160 controls such operations, even though in the illustrated example the CPU 150 and GPU 120 are depicted as separate from the source guest VM 160.

Typically, at least some instructions in a workload rely on data accessed from the system memory 130 or 132 (e.g., data representing primitives or textures during an image rendering workload) or frame buffer 162, 172, and thus execution of such instructions at the GPUs 120, 122 triggers the GPUs 120, 122 to initiate a memory access operation to obtain the data from the system memory 130, 132 or frame buffer 162, 172. In the course of executing the sets of instructions, the GPUs 120, 122 generate memory access requests, including write requests to store data at the system memories 130, 132 or frame buffer 162, 172 and read requests to retrieve data from the system memories 130, 132 or frame buffer 162, 172, respectively. Each memory access request includes a memory address (e.g., a system physical address) indicating a location at the system memory 130 or 132 or frame buffer 162, 172 targeted by the memory access request. In response to a read request, the system memory 130 or 132 or frame buffer 162, 172 retrieves information (data or instructions) stored at the location corresponding to the memory address of the read request and provides the information to the GPU 120 or 122 that generated the memory access request. In response to a write request, the system memory 130 or 132 or frame buffer 162, 172 stores write information of the request at the location corresponding to the memory address of the write request.

The processing system 100 employs a paged memory approach, with each page representing a corresponding block of a certain size (e.g., 4K bytes) of the system memories 130, 132 or frame buffer 162, 172. To track accesses on behalf of each VM to the system memories 130, 132, and frame buffer 162, 172, each of the GPUs 120, 122 maintains a page table 125, 127, respectively, that includes a plurality of page table entries (PTEs) (not shown), with each PTE corresponding to a page currently in use at the corresponding VM, and storing various information in a plurality of fields, such as virtual address (VA) field storing at least a portion of a VA representing the corresponding page, a physical address (PA) field storing at least a portion of a PA to which the virtual addresses of the corresponding page are mapped, as well as a status/control field to store various status and control information for the page, such as whether an access was for read, write, or read/write.

To facilitate live migration of the source guest VM 160 running at the processing unit 102 to the destination guest VM 170 running at the processing unit 104, the hypervisor 140 identifies and copies only the subset 165 of pages allocated to the source guest VM 160 that were modified by the source guest VM 160 between a first time and a second time to the destination guest VM 170. In embodiments in which the processing units 102 and 104 run on different processing systems and employ different sets of hypervisors, the two hypervisors handshake between themselves to copy between source guest VM 160 and destination guest VM 170. To illustrate, the hypervisor 140 initiates a live migration from the source guest VM 160 running at the processing unit 102 to the destination guest VM 170 running at the processing unit 104 by signaling to the source guest VM 160 that migration has started and reducing a time slice allocated to the source guest VM 160 at the processing unit 102. The hypervisor 140 then copies memory pages allocated to the source guest VM 160 in one or more passes.

For a single-pass live migration, the hypervisor 140 on processing unit 102 or its peers on processing unit 104:
(a) copies from the device memory 180 of the processing unit 102 to the device memory 185 of the processing unit 104 memory pages allocated to the source guest VM 160,
(b) copies from the system memory 130 of the processing unit 102 to the system memory 132 of the processing unit 104 only the subset 165 of pages 135 allocated to the source guest VM 160 that were modified by the source guest VM 160 during the time the source guest VM 160 was running at the processing unit 102, and
(c) copies the contents of the frame buffer 162 of the source guest VM 160 to the frame buffer 172 of the destination guest VM 170.

For a multiple-pass live migration,
(a) in a first pass, the hypervisor 140 copies (i) memory pages allocated to the source guest VM 160 from the device memory 180 of the processing unit 102 to the device memory 185 of the processing unit 104, (ii) only the subset 165 of memory pages 135 of system memory 130 allocated to the source guest VM 160 that were modified by the source guest VM 160 during the time the source guest VM 160 was running at the processing unit 102, and (iii) the contents of the frame buffer 162 of the source guest VM 160 to the frame buffer 172 of the destination guest VM 170,
(b) in a next pass, the hypervisor 140 copies (i) only a subset of memory pages 135 of system memory 130 allocated to the source guest VM 160 that were modified by the source guest VM 160 during the time since the first pass, and (iii) pages of the frame buffer 162 that were modified by the source guest VM 160 during the time since the first pass, and
(c) if there are subsequent passes, the hypervisor 140 copies from the system memory 130 and frame buffer 162 only pages 163 that were modified by the source guest VM 160 during the time since the previous pass.

In some embodiments, for a multi-pass live migration, during the initial pass the hypervisor copies all of the pages 135 of system memory allocated to the source guest VM 160, including pages that were not modified by the source guest VM 160, as the unmodified pages may include textures of images. However, in subsequent passes, the hypervisor 140 copies only pages that were modified by the source guest VM 160 during the time since the previous pass.

To identify the pages that were modified by the source guest VM 160 during a time period, the hypervisor 140 queries the API/driver 154 to compile a list based on the page table 125 maintained by the GPU 120 of write and read/write accesses to system memory 130 by the source guest VM 160 during the time period. Based on the compiled lists, the hypervisor 140 identifies the modified pages as those pages that were the subjects of write or read/write accesses.

Figure 2:
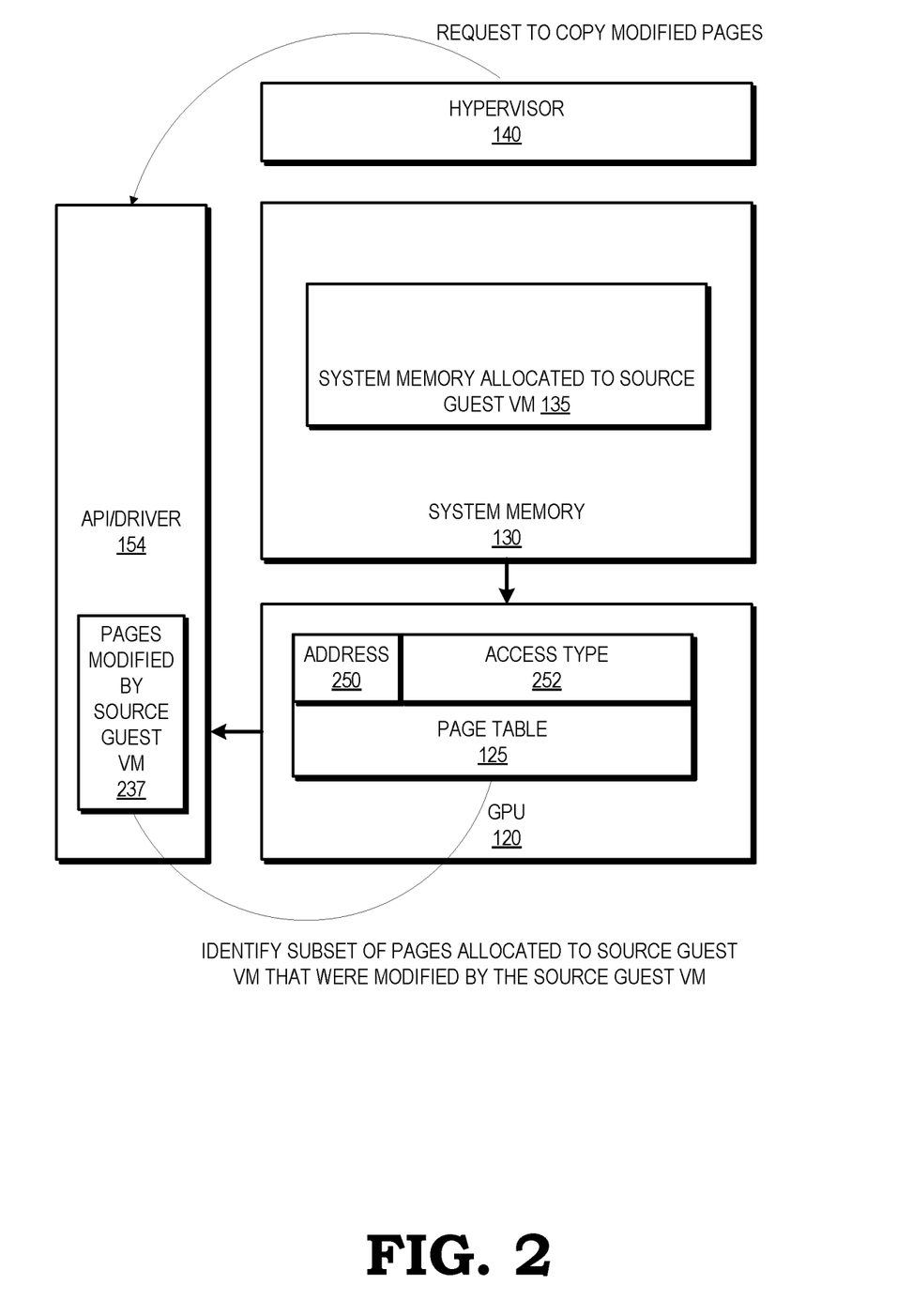
FIG. 2 is a block diagram of an application program interface of FIG. 1 configured to identify the subset of pages of memory allocated to the first virtual machine that were modified by the first virtual machine based on a page table maintained by a processing unit of the processing system in accordance with some embodiments.

FIG. 2 is a block diagram of the application program interface (API)/driver 154 of the processing unit 102 of FIG. 1 configured to identify the subset of pages 135 of system memory 130 allocated to the source guest VM 160 that were modified by the source guest VM 160 and the subset of pages 163 that were modified by the source guest VM at the frame buffer 162 based on a page table 125 maintained by the GPU 120 of the processing unit 102 of the processing system 100 in accordance with some embodiments. For each access to system memory 130 or frame buffer 162 by the source guest VM 160, the GPU 120 creates an entry at the page table 125. In some embodiments, the page table 125 includes an address field 250 and an access type field 252. The address field 250 indicates the physical address of each access, and the access type field 252 indicates whether the access was a read access, a write access, or a read/write access.

In response to receiving a query from the hypervisor 140, the API/driver 154 compiles a list of system memory addresses or a list of frame buffer addresses that were the subjects of write or read/write accesses by the source guest VM 160, based on the page table entries maintained by the GPU 120 at the page table 125. In some embodiments, the API/driver 154 compiles the list of system memory addresses that were the subjects of write or read/write accesses by the source guest VM 160 and a second API/driver (not shown) compiles the list of frame buffer addresses that were the subjects of write or read/write accesses by the source guest VM 160. In some embodiments, the API/driver 154 performs address translation to map the virtual addresses corresponding to the physical address 250 indicated by page table 125. If the physical address 250 in the page table 125 indicates the system memory 130, in some embodiments the mapping goes through the IOMMU 110 of FIG. 1 to determine the real system physical address. If the physical address 250 in the page table 125 indicates the frame buffer 162, in some embodiments the mapping goes through memory controller 115 to determine the location in the frame buffer 162. The API/driver 154 passes the list of dirty pages to the hypervisor 140 for copying to the destination guest VM 170 of FIG. 1. In some embodiments, the hypervisor 140 copies the dirty pages to the destination guest VM 170. In other embodiments, the hypervisor 140 instructs the API/driver 154 to copy the dirty pages out to some hypervisor-allowed system memory, and hypervisor copies them to the destination guest VM 170. For a multi-pass live migration, the process of identifying dirty pages on the source guest VM 160 and copying dirty pages to the destination guest VM 170 is repeated one or more times, with the API/driver 154 compiling a list of system memory addresses that were the subjects of write or read/write accesses by the source guest VM 160 in the time period since the previous list was compiled.

Figure 3:
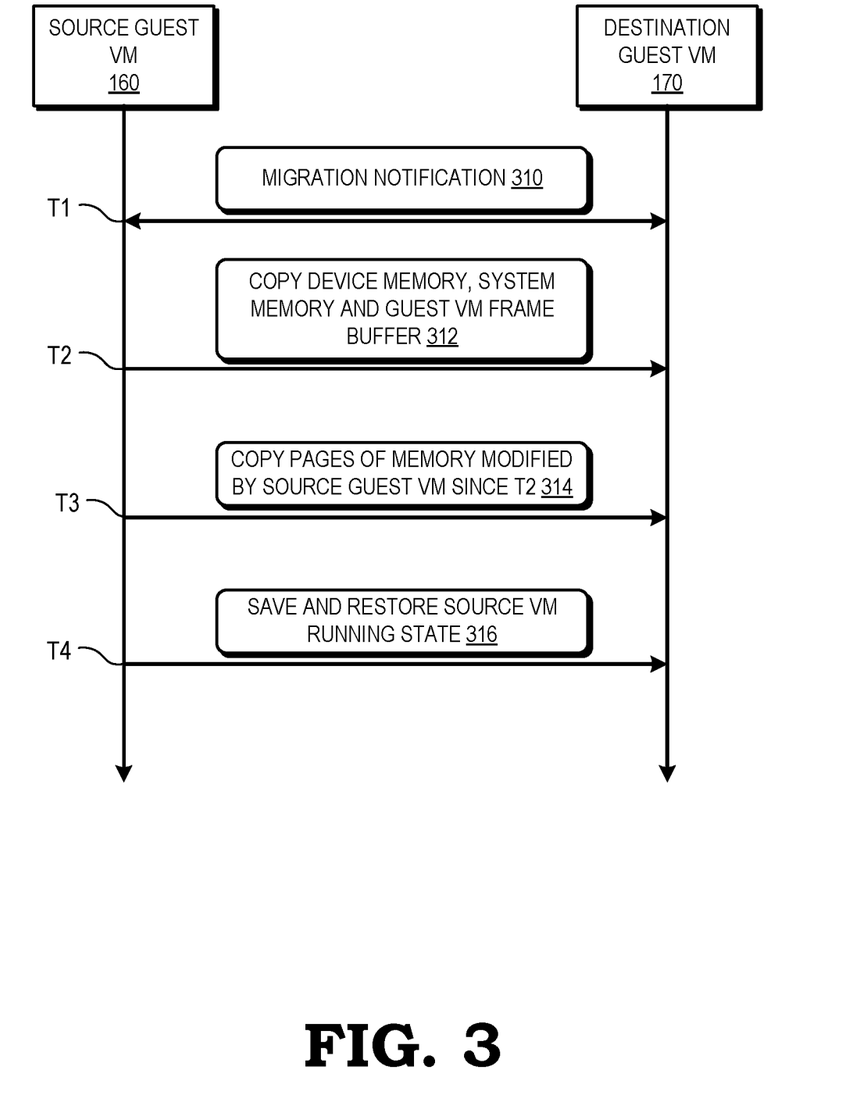
FIG. 3 is a diagram illustrating a live migration from a source virtual machine to a destination virtual machine in which only a subset of page of memory modified by the source virtual machine are copied to the destination virtual machine in accordance with some embodiments.

FIG. 3 is a diagram illustrating a multi-pass live migration from a source guest virtual machine 160 to a destination guest virtual machine 170 in which only a subset of pages of memory modified by the source guest VM 160 are copied to the destination guest VM 170 in accordance with some embodiments. At a time T1, the hypervisor 140 informs the source guest VM 160 and the destination guest VM 170 that migration has begun by sending a migration notification 310. At time T2, the hypervisor 140 copies 312 (i) pages of device memory 180 allocated to the first GPU at source guest VM 160, (ii) pages 135 of system memory 130 allocated to the source guest VM 160, and (iii) the contents of the frame buffer 162 to the first GPU at the source guest VM 160 to the destination guest VM 170 correspondingly. At time T3, the hypervisor 140 queries the API/driver 154 to compile a list of pages modified by the source guest VM 160 since time T2 and copies 314 only the pages of device memory, system memory, and frame buffer modified by the source guest VM 160 since time T2. At time T4, the hypervisor 140 saves 316 the source guest VM 160 running state and restores the running state at the destination guest VM 170.

Figure 4:
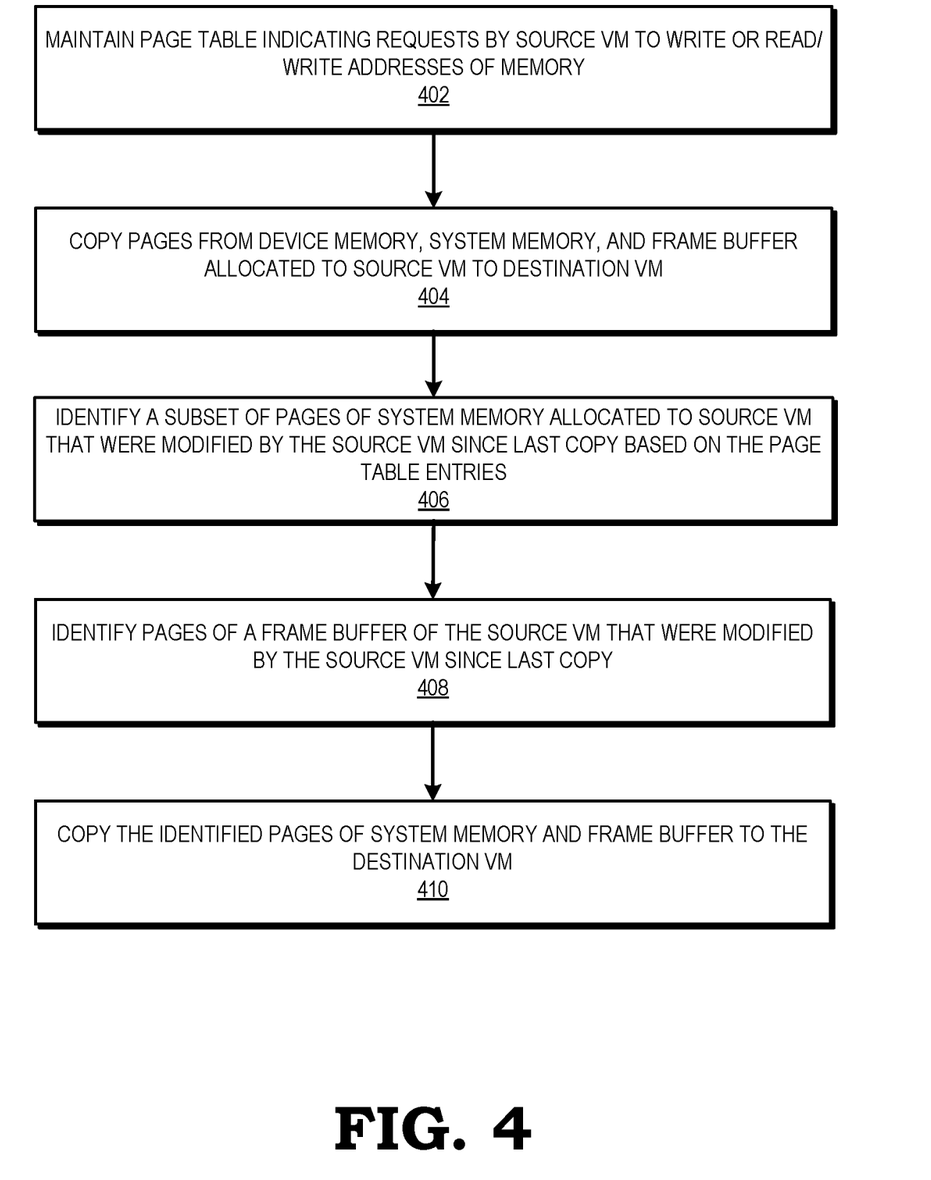
FIG. 4 is a flow diagram illustrating a method for identifying a subset of pages of memory allocated to a first virtual machine that were modified by the first virtual machine and transferring only the subset to a second virtual machine when performing a live migration in accordance with some embodiments.

FIG. 4 is a flow diagram illustrating a method 400 for identifying a subset 165 of pages of memory allocated to a first virtual machine that were modified by the first GPU (e.g., GPU 120 of FIG. 1) and transferring only the subset to a second virtual machine and the second GPU (e.g., GPU 122 of FIG. 1) when performing a live migration in accordance with some embodiments. The method 400 is implemented in some embodiments of the processing system 100 shown in FIG. 1.

At block 402, the GPU 120 of the processing unit 102 on which the source guest VM 160 is running maintains a page table 125 indicating memory accesses by the GPU 120 to the pages 135 of system memory and pages 163 of frame buffer allocated to the source guest VM 160. At block 404, the live migration transfer begins with the hypervisor 140 copying pages from device memory 180 and frame buffer 162 of the GPU 120, and system memory 130 that were allocated to the source guest VM 160, to the GPU 122 and system memory 132 in destination guest VM 170. At block 406, the API/driver 154 identifies a subset 165 of pages of system memory 130, device memory 180 and frame buffer 162 allocated to the source guest VM 160 that were modified by the GPU 120 in source guest VM 160 since the hypervisor 140 copied pages to the destination guest VM 170 at block 404. At block 408, the hypervisor 140 identifies pages of the device memory 180 and frame buffer 162 of the GPU 122 and the system memory 130 in source guest VM 160 that were modified by the source guest VM 160 since the hypervisor 140 copied pages to the destination guest VM 170 at block 404. At block 410, the hypervisor 140 (or the API/driver 154, at the hypervisor 140's request) copies the pages of system memory 130 and the frame buffer 162 as well as device memory 180 that were identified at blocks 406, 408, as having been modified to the destination guest VM 170.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
identifying a subset of pages of system memory allocated to a first virtual machine, the subset of pages comprising pages modified by a first graphics processing unit (GPU) at the first virtual machine; and
copying only the subset of pages to at least one of system memory, device internal memory, or a device frame buffer allocated to a second virtual machine in response to migrating a client or application from the first virtual machine to the second virtual machine.

2. The method of claim 1, further comprising:
maintaining, at the first GPU, a page table of addresses of pages of at least one of system memory, device internal memory, or a device frame buffer requested by the first virtual machine, the page table indicating for each page if the page is a subject of at least one of a read/write request or a write request; and
wherein identifying the subset comprises identifying pages that are subjects of read/write requests or write requests based on the page table.

3. The method of claim 2, further comprising:
tracking, at the page table, pages of system memory and the device frame buffer allocated to the first virtual machine that were modified by the first GPU at the first virtual machine between a first time and a second time; and
wherein identifying is based on the tracked pages.

4. The method of claim 2, further comprising:
tracking, at the page table, pages of device internal memory that were modified by the first GPU at the first virtual machine between a first time and a second time; and
wherein identifying is based on the tracked pages.

5. The method of claim 1, further comprising:
identifying a subset of pages of frame buffer memory allocated to the first virtual machine, the subset of pages comprising pages modified by the first GPU at the first virtual machine; and
copying only the subset of pages to frame buffer memory allocated to a second GPU at a second virtual machine in response to migrating a client or application from the first virtual machine to the second virtual machine.

6. The method of claim 5, further comprising:
tracking, at a page table, pages of frame buffer memory allocated to the first virtual machine that were modified by the first GPU at the first virtual machine between a first time and a second time; and
wherein identifying is based on the tracked pages.

7. The method of claim 6, further comprising:
tracking, at the page table, pages of frame buffer memory allocated to the first virtual machine that were modified by the first GPU at the first virtual machine between the second time and a third time, wherein identifying is based on the tracked pages; and
copying the pages of frame buffer memory allocated to the first virtual machine that were modified by the first GPU at the first virtual machine between the second time and the third time to the second virtual machine.

8. A method, comprising:
migrating a first virtual machine executing at a first processing unit to a second virtual machine executing at a second processing unit, wherein migrating comprises transferring from the first virtual machine to the second virtual machine only a subset of pages of system memory allocated to the first virtual machine, the subset comprising pages that were modified by a first graphics processing unit (GPU) executing the first virtual machine.

9. The method of claim 8, further comprising:
maintaining, at the first GPU, a page table comprising entries of addresses of pages of system memory requested by the first virtual machine, the page table indicating for each page if the page is a subject of at least one of a read/write request or a write request; and
identifying the subset based on the entries of the page table.

10. The method of claim 9, further comprising:
tracking, at the page table, pages of system memory allocated to the first virtual machine that were modified by the first GPU in the first virtual machine between a first time and a second time; and
wherein identifying is based on the tracked pages.

11. The method of claim 9, further comprising:
tracking, at the page table, pages of device internal memory that were modified by the first GPU at the first virtual machine between a first time and a second time; and
wherein identifying is based on the tracked pages.

12. The method of claim 8, further comprising:
identifying a subset of pages of frame buffer memory allocated to the first virtual machine, the subset comprising pages modified by the first GPU in the first virtual machine; and
copying only the subset of pages to frame buffer memory allocated to a second GPU in the second virtual machine in response to migrating a client or application from the first virtual machine to the second virtual machine.

13. The method of claim 12, further comprising:
tracking, at a page table, pages of frame buffer memory allocated to the first virtual machine that were modified by the first GPU in the first virtual machine between a first time and a second time; and
wherein identifying the subset of pages of frame buffer memory is based on the tracked pages.

14. The method of claim 13, further comprising:
tracking, at the page table, pages of frame buffer memory allocated to the first virtual machine that were modified by the first GPU in first virtual machine between the second time and a third time, wherein identifying is based on the tracked pages; and
copying the pages of frame buffer memory allocated to the first virtual machine that were modified by the first GPU in the first virtual machine between the second time and the third time to the second virtual machine.

15. A processing system, comprising:
a first virtual machine executing at a first processing unit comprising a first graphics processing unit (GPU);
a second processing unit;
a system memory, wherein a portion of pages of system memory is allocated to the first virtual machine; and
one or more hypervisors to migrate the first virtual machine from the first processing unit to a second virtual machine executing at the second processing unit, wherein the one or more hypervisors are configured to transfer from the first processing unit to at least one of system memory, device internal memory, or a device frame buffer allocated to the second virtual machine only a subset of the portion of pages of system memory allocated to the first virtual machine, the subset comprising pages modified by the first GPU at the first virtual machine, in response to migrating the first virtual machine to the second virtual machine.

16. The processing system of claim 15, wherein the first processing unit is configured to maintain a page table of addresses of pages of system memory requested by the first virtual machine, the page table indicating for each page if the page is a subject of at least one of a read/write request or a write request, and wherein the subset of the pages is identified based on the page table.

17. The processing system of claim 16, wherein the page table is further configured to track pages of device internal memory that were modified by the first GPU in the first virtual machine between a first time and a second time; and wherein the one or more hypervisors are further configured to transfer from the first processing unit to the second processing unit the tracked pages of device internal memory.

18. The processing system of claim 15, further comprising:

a frame buffer allocated to the first processing unit; and
wherein the hypervisor is further configured to:
identify a subset of pages of frame buffer memory allocated to the first virtual machine, the subset comprising pages modified by the first GPU in the first virtual machine; and
transfer only the subset of pages to frame buffer memory allocated to the second virtual machine in response to migrating a client or application from the first virtual machine to the second virtual machine.

19. The processing system of claim 18, wherein the hypervisor is further to:

track, at a page table, pages of frame buffer memory allocated to the first virtual machine that were modified by the first GPU in the first virtual machine between a first time and a second time; and
identify the subset of pages of frame buffer memory based on the tracked pages.

20. The processing system of claim 19, wherein the hypervisor is further to:

track, at the page table, pages of frame buffer memory allocated to the first virtual machine that were modified by the first GPU in the first virtual machine between the second time and a third time; and
transfer the pages of frame buffer memory allocated to the first virtual machine that were modified by the first GPU in the first virtual machine between the second time and the third time to the second virtual machine.

* * * * *